US008937939B2

(12) United States Patent
Wirola et al.

(10) Patent No.: US 8,937,939 B2
(45) Date of Patent: *Jan. 20, 2015

(54) SYNCHRONIZATION INDICATION IN NETWORKS

(71) Applicant: Nokia Corporation, Espoo (FI)

(72) Inventors: Lauri Wirola, Tampere (FI); Ismo Halivaara, Tampere (FI); Jari Syrjarinne, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 14/094,572

(22) Filed: Dec. 2, 2013

(65) Prior Publication Data

US 2014/0085140 A1 Mar. 27, 2014

Related U.S. Application Data

(63) Continuation of application No. 12/340,548, filed on Dec. 19, 2008, now Pat. No. 8,625,572.

(51) Int. Cl.
  *H04B 7/185* (2006.01)
  *H04W 4/00* (2009.01)
  *G01S 19/05* (2010.01)
  *G01S 19/25* (2010.01)
  *H04W 56/00* (2009.01)

(52) U.S. Cl.
  CPC .............. *G01S 19/05* (2013.01); *G01S 19/254* (2013.01); *G01S 19/256* (2013.01); *H04W 56/00* (2013.01)
  USPC ........... 370/350; 370/252; 370/316; 370/328; 370/503; 370/338

(58) Field of Classification Search
  USPC ......................................................... 370/350
  See application file for complete search history.

(56) References Cited

U.S. PATENT DOCUMENTS 5,353,332 A    10/1994   Raith et al.
5,828,661 A * 10/1998   Weaver et al. ................ 370/331
(Continued)

FOREIGN PATENT DOCUMENTS

CN          101076979      11/2007
EP           1784954       5/2007
(Continued)

OTHER PUBLICATIONS

3GPP TS 25.331 V8.4.0 (Sep. 2008), pp. 425-444.
(Continued)

*Primary Examiner* — Ian N Moore
*Assistant Examiner* — Jenee Williams
(74) *Attorney, Agent, or Firm* — Locke Lord LLP

(57) ABSTRACT

Systems and methods provide a network's synchronization status to a terminal when the terminal receives a transmission from the network. This network synchronization status can be indicated in accordance with various methods including, but not limited to the following: with a status flag in a network message; in a network capability indication; in a network's positioning capability indication; cell/network time relation information; in a time relation information of different Radio Access Technologies; and implicitly with another parameter and/or by a request for a certain measurement. When the network's synchronization status is determined, accurate time information/time assistance data can be maintained at the terminal.

20 Claims, 4 Drawing Sheets

(56) References Cited

U.S. PATENT DOCUMENTS

| | | | |
|---|---|---|---|
| 5,893,044 A | 4/1999 | King et al. | |
| 5,898,902 A * | 4/1999 | Tuzov | 455/13.1 |
| 5,918,156 A * | 6/1999 | Tanabe | 455/12.1 |
| 6,321,088 B1 | 11/2001 | Dempo | |
| 6,321,090 B1 | 11/2001 | Soliman | |
| 6,353,412 B1 | 3/2002 | Soliman | |
| 6,407,986 B1 | 6/2002 | Dutta | |
| 6,424,297 B2 | 7/2002 | Tamura et al. | |
| 6,452,541 B1 | 9/2002 | Zhao et al. | |
| 6,480,483 B2 * | 11/2002 | Yahata et al. | 370/350 |
| 6,542,743 B1 * | 4/2003 | Soliman | 370/331 |
| 6,763,241 B2 | 7/2004 | Gous et al. | |
| 6,788,249 B1 | 9/2004 | Farmer et al. | |
| 7,009,948 B1 | 3/2006 | Carlsson et al. | |
| 7,099,623 B2 * | 8/2006 | Gibson et al. | 370/328 |
| 7,158,883 B2 * | 1/2007 | Fuchs et al. | 370/350 |
| 7,359,706 B2 | 4/2008 | Zhao | |
| 7,400,974 B2 * | 7/2008 | Fuchs et al. | 370/350 |
| 7,558,226 B2 * | 7/2009 | Anderson et al. | 370/328 |
| 7,579,983 B2 | 8/2009 | Matsumoto | |
| 7,613,148 B2 | 11/2009 | Hong et al. | |
| 7,710,944 B1 | 5/2010 | Yoon | |
| 7,792,069 B2 * | 9/2010 | Karabinis | 370/316 |
| 7,899,002 B2 * | 3/2011 | Karabinis | 370/316 |
| 8,050,296 B2 | 11/2011 | Osterling | |
| 8,265,006 B2 | 9/2012 | Ahmadi et al. | |
| 2001/0009544 A1 | 7/2001 | Vanttinen et al. | |
| 2002/0012363 A1 * | 1/2002 | Beidas et al. | 370/516 |
| 2002/0027933 A1 | 3/2002 | Vanttinen | |
| 2002/0075833 A1 | 6/2002 | Dick et al. | |
| 2002/0089946 A1 | 7/2002 | Hutchings | |
| 2002/0135511 A1 | 9/2002 | Zhao et al. | |
| 2002/0167441 A1 * | 11/2002 | McBurney et al. | 342/357.03 |
| 2002/0167918 A1 | 11/2002 | Brewer | |
| 2003/0011511 A1 | 1/2003 | King et al. | |
| 2003/0016167 A1 | 1/2003 | Dooley et al. | |
| 2003/0040331 A1 | 2/2003 | Zhao | |
| 2003/0067903 A1 | 4/2003 | Jorgensen | |
| 2003/0096574 A1 | 5/2003 | Anderson et al. | |
| 2003/0109264 A1 | 6/2003 | Syjarinne et al. | |
| 2003/0148761 A1 | 8/2003 | Gaal | |
| 2003/0203745 A1 * | 10/2003 | Chiang et al. | 455/502 |
| 2004/0077311 A1 * | 4/2004 | Riley | 455/12.1 |
| 2004/0121728 A1 * | 6/2004 | Gibson et al. | 455/12.1 |
| 2004/0142660 A1 | 7/2004 | Churan | |
| 2004/0228308 A1 * | 11/2004 | Joshi et al. | 370/335 |
| 2005/0003842 A1 * | 1/2005 | Harju et al. | 455/502 |
| 2005/0020282 A1 | 1/2005 | Pande et al. | |
| 2005/0058149 A1 | 3/2005 | Howe | |
| 2005/0080561 A1 | 4/2005 | Abraham et al. | |
| 2006/0003775 A1 | 1/2006 | Bull et al. | |
| 2006/0050660 A1 | 3/2006 | Wells | |
| 2006/0099910 A1 | 5/2006 | Anderson et al. | |
| 2007/0025293 A1 * | 2/2007 | Choi | 370/331 |
| 2007/0030841 A1 * | 2/2007 | Lee et al. | 370/352 |
| 2007/0087764 A1 * | 4/2007 | Buckley et al. | 455/466 |
| 2007/0165677 A1 * | 7/2007 | Monnerat et al. | 455/13.2 |
| 2007/0183486 A1 | 8/2007 | Cheng et al. | |
| 2008/0089269 A1 | 4/2008 | Tsutsui | |
| 2008/0175038 A1 | 7/2008 | Carlson et al. | |
| 2008/0316091 A1 | 12/2008 | Wigren et al. | |
| 2009/0052430 A1 * | 2/2009 | Gorokhov et al. | 370/350 |
| 2009/0054075 A1 * | 2/2009 | Boejer et al. | 455/456.1 |
| 2009/0247156 A1 * | 10/2009 | Sampath et al. | 455/434 |
| 2009/0247164 A1 * | 10/2009 | Kandukuri Narayan et al. | 455/436 |
| 2009/0290555 A1 | 11/2009 | Alpert et al. | |
| 2009/0296628 A1 * | 12/2009 | Karabinis | 370/319 |
| 2011/0103433 A1 | 5/2011 | Krasner | |
| 2013/0089030 A1 | 4/2013 | Yu | |

FOREIGN PATENT DOCUMENTS

| | | | |
|---|---|---|---|
| WO | WO 9944073 A1 * | 9/1999 | G01S 5/14 |
| WO | WO2008013404 | 1/2008 | |
| WO | WO2008058162 | 5/2008 | |
| WO | WO2009026557 | 2/2009 | |

OTHER PUBLICATIONS

3GPP TS 44 031 V*.1.0 (Dec. 2008), pp. 8-17.

ISR for PCT Application No. PCT/IB2009/00773 dated Apr. 30, 2010.

J. Syrjarinne, et al. "Setting a New Standard: Assisting GNSS receivers that use Wireless Networks," InsideGNSS, vol. 1, No. 7, pp. 26-31, Oct. 2006.

* cited by examiner

SYNCHRONIZATION INDICATION IN NETWORKS

This application is a continuation of U.S. application Ser. No. 12/340,548, filed Dec. 19, 2008, and of which the entire contents is incorporated herein by reference.

FIELD

Various embodiments relate generally to positioning technologies for location-based services. More particularly, various embodiments relate to obtaining accurate time information at a terminal.

BACKGROUND

This section is intended to provide a background or context to various embodiments that are recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Location services based on the location of mobile devices are becoming increasingly widespread. Assistance data for assisted navigation systems, such as global navigation satellite systems (GNSS), have been specified and standardized for cellular systems, e.g., global positioning systems (GPS), European Galileo, and Russian Global Navigation Satellite System (GLONASS). An exemplary GNSS can comprise a network of satellites that broadcasts navigation signals including time and distance data. GNSS receivers pick up these broadcasted navigation signals and calculate a precise global location based thereon. Other examples of GNSS include, but are not limited to, satellite-based augmentation systems (SBAS), local area augmentation systems (LAAS), quasi-zenith satellite systems (QZSS), and hybrid receivers.

The delivery of such assistance data can be built on top of cellular system-specific control plane protocols including, e.g., the radio resource location services protocol (RRLP) for GSM networks, the radio resource control (RRC) protocol of layer 3 in wideband code division multiple access (WCDMA) networks, and IS-801 for Code Division Multiple Access (CDMA) networks, standardized in the 3$^{rd}$ Generation Partnership Project (3GPP) and 3GPP2 standards. In addition, the control plane protocols also support Radio Access Network (RAN)-specific positioning methods. Examples include Enhanced Observed Time Difference (EOTD) in RRLP and Idle Period DownLink—Observed Time Difference Of Arrival (IPDL-OTDOA). It should be noted that assistance data as described herein, can refer to GNSS assistance containing, but not limited to, navigation models, time assistance, reference location, atmosphere models, differential corrections, sensor assistance and acquisition assistance. The assistance data can also include e.g. position information, high-accuracy position information, multi-frequency multi-GNSS measurement data, computationally-generated measurements, sensor measurements, route information and waypoint information.

As described above, assistance data may include, amongst other data, navigation models for the satellites, reference location and reference time. Whether the reference location and time are accurate or not has a major impact on performance and thus, information regarding GNSS time is crucial in solving the GNSS receiver's position. Keeping accurate time in, e.g., an Assisted GNSS (AGNSS) terminal/receiver (where time information is provided as assistance data) requires, for example, either an accurate and expensive oscillator, power-consuming miniature atomic clock, frequent connection to the satellites, or frequent requests of the time assistance from the network. Frequent connections to, e.g., satellites and/or a network, are power-consuming and thus degrade the user experience.

In technical terms, accurate time assistance together with reference position allows for the prediction of a code phase and Doppler frequency search space for spread spectrum satellite broadcasts. Having a small search window improves sensitivity contributing to Time-To-First-Fix (TTFF) and availability. Both aspects are important from the customer-satisfaction point-of-view.

It should be noted that other assistance data, such as ephemerides, have a lifetime of several hours. Therefore, the need to update such information needs is relatively rare. However, with conventional oscillators, time can be kept sufficiently accurate in a terminal on the order of only tens of minutes. Hence, it would be beneficial to be able to maintain an accurate time relation in a terminal by some other system or method.

When a mobile terminal is operating in a network that is synchronized to GNSS time, it can use this information to maintain accurate time even when moving from one cell to another within the same network. However, in networks that may be either synchronous or asynchronous, such as Evolved Universal Mobile Telecommunications System Terrestrial Radio Access Network (E-UTRAN), the terminal does not know about the networks synchronization status and cannot utilize this potential. In certain synchronized networks, such as IS-95/2000 and WiMAX, synchronization is a feature that is defined in the standard. That is, time transfer is an intrinsic feature of, e.g., the IS-95/2000 system, where the 3GPP RRLP and 3GPP RRC define the time assistance for control using cell frame timings. In addition, IS-95 is directly synchronized to GPS time, so accurate GPS time is readily available from every cell, making the maintenance of accurate time in the handsets unnecessary. Hence the information is available to the terminal in the design phase. Moreover, these networks also broadcast the GPS time information.

Open Mobile Alliance secure user plane location (OMA SUPL) protocol does the same in the user plane, where a reference time is given in the form of a difference between the GNSS time and the cell frame timing of the serving base station. In IP-networks, clocks can be synchronized using protocols specifically designed for this purpose. Additionally, certain systems enable AGNSS receiver time assistance over IP/an IP network connection by utilizing different combinations of at least one of the following: a time transfer protocol; a time server; a GNSS-receiver for obtaining the relationships between the time-server's time and the GNSS time scales; a time server synched to a specified GNSS time; a service providing differences between GNSS time scales; and user plane assistance protocols for transferring the relationship(s) from a server to a terminal.

SUMMARY

One exemplary embodiment relates to a method of providing network synchronization status to a terminal comprising receiving a transmission from a network. The method further comprises determining a synchronization status of the network from the transmission, where accurate time is maintained based on the synchronization status of the network.

Another exemplary embodiment relates to an apparatus comprising an electronic device. The electronic device is configured to receive a transmission from a network. The electronic device is further configured to determine a synchronization status of the network from the transmission, where accurate time is maintained by the electronic device based on the synchronization status of the network.

These and other advantages and features of various embodiments of the present invention, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

Various embodiments are described by referring to the attached drawings, in which.

DETAILED DESCRIPTION OF VARIOUS EMBODIMENTS

Figure 1:
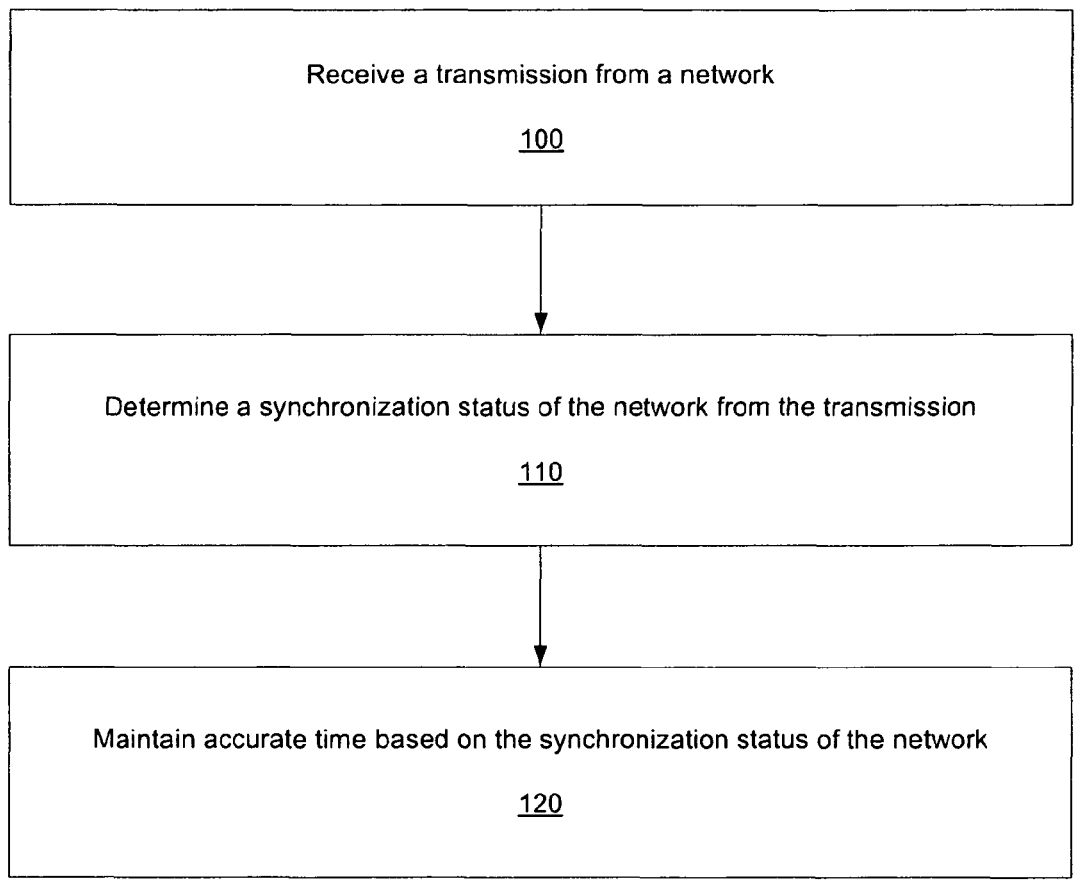
FIG. 1 is a flow chart illustrating exemplary processes performed for maintaining accurate timing in a terminal via a network synchronization status transmitted during a network transmission in accordance with various embodiments.

The availability of assistance data, e.g., time information, described above can greatly affect GNSS receiver performance. For example, in scenarios where good signal conditions exist, approximately 30 seconds are typically needed for a GPS receiver to extract a copy of a navigation message from a signal broadcasted by a satellite. Therefore, if no valid copy (e.g., from a previous session) of a navigation model is available, at least 18 seconds (a theoretical minimum, although 30 seconds is a more typical value) elapse before the satellite can be used in position calculations. With regard to Assisted GPS (AGPS) receivers, a cellular network sends a receiver a copy of a navigation message. Therefore, the receiver need not extract navigation data from the satellite broadcast, but rather can obtain it directly from the network. TTFF can be reduced to 10 seconds or less (as opposed to the 30 seconds required for conventional GPS systems). This reduction in TTFF is crucial in scenarios when, for example, positioning an emergency call is required. Additionally, this reduction in TTFF can improve the user experience in various use cases.

Various embodiments provide a networks synchronization status to a terminal when the terminal receives a transmission from the network in question. This network synchronization status can be indicated utilizing various methods including, but not limited to the following: with a status flag in a (system) message from the network; in a network capability indication; in a networks positioning capability indication; in GNSS time, i.e., cell/network time relation information; in a time relation information of different Radio Access Technologies (RATs); and/or implicitly with another parameter and/or by a request for a certain measurement (e.g., certain assistance data that is only provided in a synchronized network or OTDOA measurement that is only requested in a synchronized network). Additionally, it should be noted that the transmission can be either a broadcast transmission or point-to-point signalling.

For example and with regard to the aforementioned RATs, "pseudo-synchronization" can be achieved between networks. That is, if the terminal obtains network synchronization status information of a first network, e.g., a 3GPP Long-Term Evolution (LTE) network, and consequently, maintains accurate time, this information can be used to "pseudo-synchronize" the LTE network with another network. Hence, a multi-mode receiver that supports, e.g., LTE and Global System for Mobile Communications (GSM) communication standards/technologies, can use the LTE network synchronization status information to indirectly relate the asynchronous GSM cells to an accurate time reference. Therefore, the benefits of a first network's synchronization status information can be extended to one or more other networks.

When the network's synchronization status is determined, accurate time information/time assistance data can be maintained at the terminal. Thus, the terminal, e.g., an AGNSS receiver, can predict the code phases and the Doppler frequencies for spread spectrum satellite broadcasts. That is, the satellite signals in view (i.e., above horizon) and hence, the receiver can find the satellite signals very quickly because of the reduced code and frequency search space. Accurate reference location and time information avoid scenarios such as when the AGNSS receiver may only be able to calculate which satellites are above the horizon and should be searched, where when either the reference location or time is unavailable, the other may become obsolete and the AGNSS receiver is required to do a full-sky search.

FIG. 1 illustrates exemplary processes performed for providing time information in a network transmission in accordance with various embodiments. At 100, a transmission is received from a network at a terminal. At 110, the synchronization status of the network is determined from the transmission. At 120, the synchronization status of the network is utilized to maintain accurate time at the terminal.

Maintaining accurate time in a terminal in accordance with various embodiments results in fewer assistance data requests (i.e., less traffic in the network), as well as improved location experience due to faster location determination, e.g., in cases where a terminal does not need to request additional assistance data from the network. Moreover, sensitivity and therefore availability are improved, if accurate time assistance is available. Additionally and assuming very accurate synchronization, using network-based measurements in hybrid (GNSS+network measurement) positioning becomes possible, where the network-based measurements can be either OTDOA or time-of-arrival (TOA)—type measurements, for example. Further still, savings in a terminal's power consumption can also be realized because the terminal is able to determine the location of a user of the terminal in a substantially shorter time than is conventionally possible.

Figure 2:
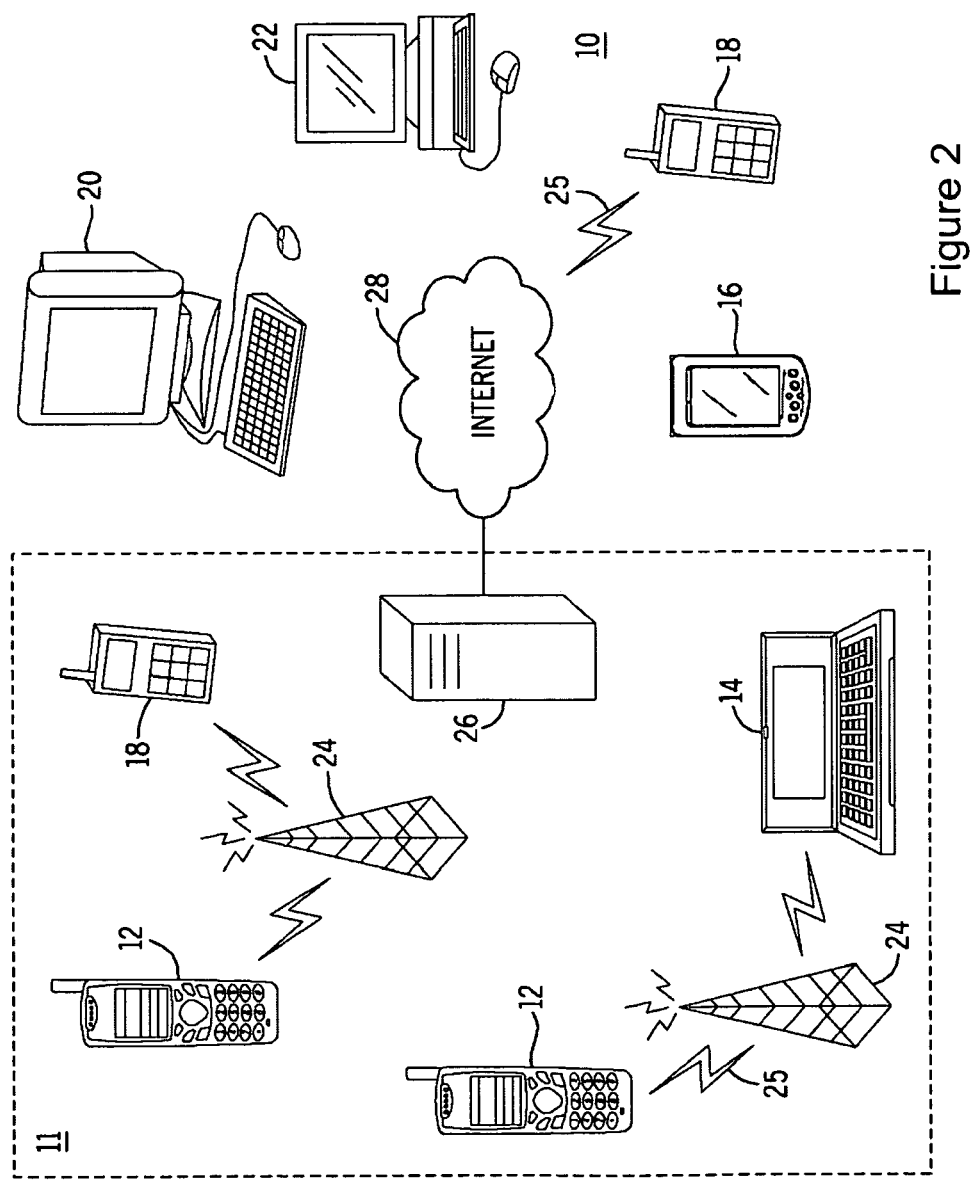
FIG. 2 is an overview diagram of a system within which various embodiments may be implemented.

FIG. 2 shows a system 10 in which various embodiments can be utilized, comprising multiple communication devices that can communicate through one or more networks. The system 10 may comprise any combination of wired or wireless networks including, but not limited to, a mobile telephone network, a wireless Local Area Network (LAN), a Bluetooth personal area network, an Ethernet LAN, a token ring LAN, a wide area network, the Internet, etc. The system 10 may include both wired and wireless communication devices.

For exemplification, the system 10 shown in FIG. 2 includes a mobile telephone network 11 and the Internet 28. Connectivity to the Internet 28 may include, but is not limited to, long range wireless connections, short range wireless connections, and various wired connections including, but not limited to, telephone lines, cable lines, power lines, and the like.

The exemplary communication devices of the system 10 may include, but are not limited to, an electronic device 12 in the form of a mobile telephone, a combination personal digital assistant (PDA) and mobile telephone 14, a PDA 16, an integrated messaging device (IMD) 18, a desktop computer 20, a notebook computer 22, etc. The communication devices may be stationary or mobile as when carried by an individual who is moving. The communication devices may also be located in a mode of transportation including, but not limited to, an automobile, a truck, a taxi, a bus, a train, a boat, an airplane, a bicycle, a motorcycle, etc. Some or all of the communication devices may send and receive calls and messages and communicate with service providers through a wireless connection 25 to a base station 24. The base station 24 may be connected to a network server 26 that allows communication between the mobile telephone network 11 and the Internet 28. The system 10 may include additional communication devices and communication devices of different types.

The communication devices may communicate using various transmission technologies including, but not limited to, Code Division Multiple Access (CDMA), GSM, Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, IEEE 802.16, LTE, etc. A communication device involved in implementing various embodiments may communicate using various media including, but not limited to, radio, infrared, laser, cable connection, and the like.

Figure 3:
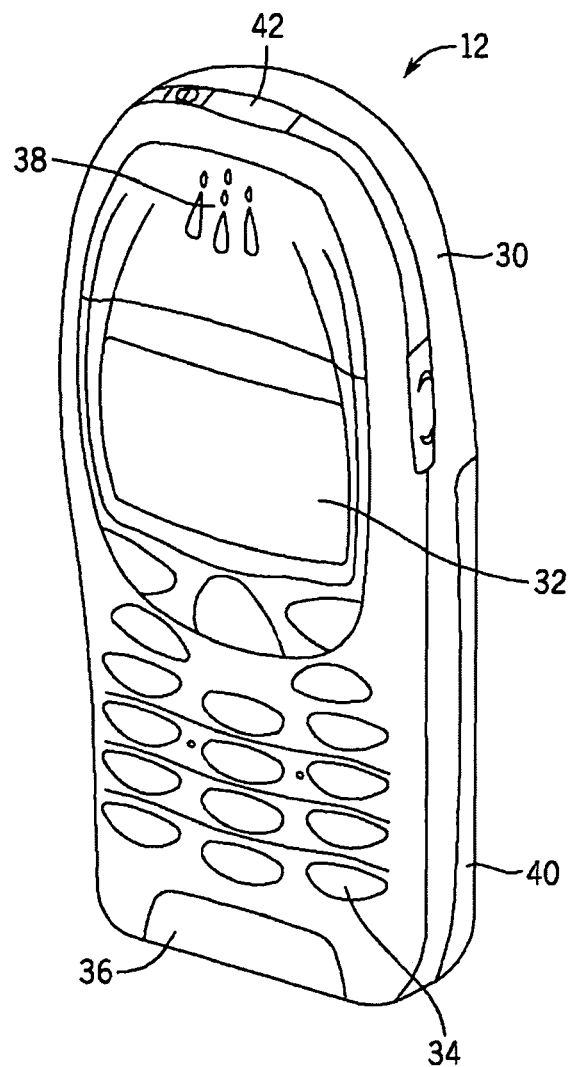
FIG. 3 is a perspective view of an electronic device that can be used in conjunction with the implementation of various embodiments.
Figure 4:
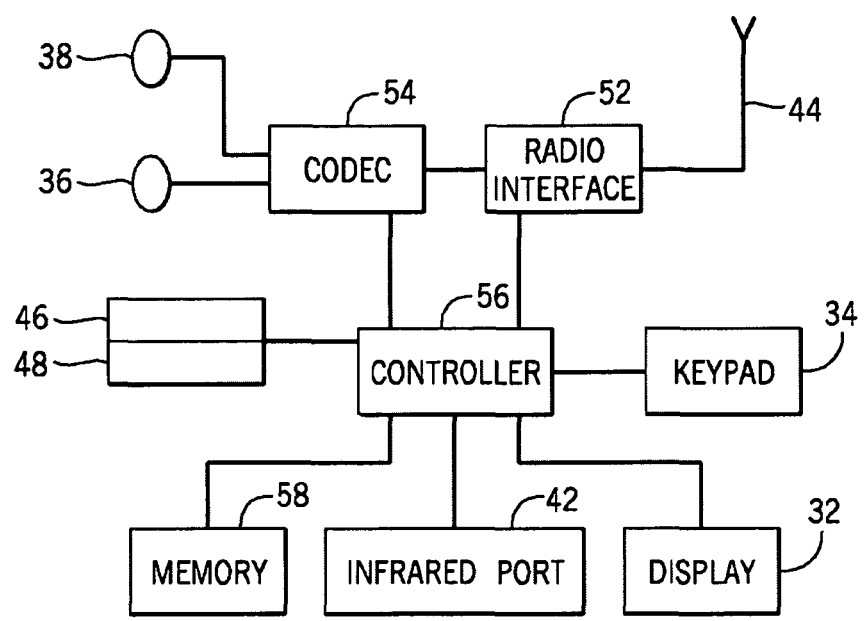
FIG. 4 is a schematic representation of the circuitry which may be included in the electronic device of FIG. 3.

FIGS. 3 and 4 show one representative electronic device 12 within which various embodiments may be implemented. It should be understood, however, that various embodiments are not intended to be limited to one particular type of device. The electronic device 12 of FIGS. 3 and 4 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment, a card reader 48, radio interface circuitry 52, codec circuitry 54, a controller 56 and a memory 58. Individual circuits and elements are all of a type well known in the art, for example in the Nokia range of mobile telephones.

Various embodiments described herein are described in the general context of method steps or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Various embodiments may be implemented in software, hardware, application logic or a combination of software, hardware and application logic. The software, application logic and/or hardware may reside, for example, on a chipset, a mobile device, a desktop, a laptop or a server. Software and web implementations of various embodiments can be accomplished with standard programming techniques with rule-based logic and other logic to accomplish various database searching steps or processes, correlation steps or processes, comparison steps or processes and decision steps or processes. Various embodiments may also be fully or partially implemented within network elements or modules. It should be noted that the words "component" and "module," as used herein and in the following claims, is intended to encompass implementations using one or more lines of software code, and/or hardware implementations, and/or equipment for receiving manual inputs.

Individual and specific structures described in the foregoing examples should be understood as constituting representative structure of means for performing specific functions described in the following the claims, although limitations in the claims should not be interpreted as constituting "means plus function" limitations in the event that the term "means" is not used therein. Additionally, the use of the term "step" in the foregoing description should not be used to construe any specific limitation in the claims as constituting a "step plus function" limitation. To the extent that individual references, including issued patents, patent applications, and non-patent publications, are described or otherwise mentioned herein, such references are not intended and should not be interpreted as limiting the scope of the following claims.

The foregoing description of embodiments has been presented for purposes of illustration and description. The foregoing description is not intended to be exhaustive or to limit embodiments to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize various embodiments and with various modifications as are suited to the particular use contemplated. The features of the embodiments described herein may be combined in all possible combinations of methods, apparatus, modules, systems, and computer program products.

What is claimed is:

1. A method, comprising:
   receiving, at a terminal apparatus, a transmission from a network, wherein the transmission includes global navigation satellite system time-cell time relation information, and wherein the transmission includes a network synchronization status flag;
   performing, at the terminal apparatus, based on the network synchronization status flag, a determination of a synchronization status of the network from the transmission, wherein the transmission comprises assistance data, and wherein the synchronization status is that cells within the network are synchronized; the network is a synchronous network rather than an asynchronous network;
   maintaining in a first cell within the network, at the terminal apparatus using said global navigation satellite system time-cell time relation information, accurate time based on the synchronization status of the network; and performing in the first cell within the network, at the terminal apparatus using said accurate time maintained in said first cell, global navigation satellite system satellite signal quick find using predicted or reduced code phases and frequency search space.

2. The method of claim 1, further comprising:

maintaining in a second cell within the network, at the terminal apparatus with move of the terminal apparatus from the first cell within the network to the second cell within the network, using said global navigation satellite system time-cell time relation information accurate time based on the synchronization status of the network; and performing in the second cell within the network, at the terminal apparatus using said accurate time maintained in said second cell, global navigation satellite system satellite signal quick find using predicted or reduced code phases and frequency search space.

3. The method of claim 1, wherein the network comprises at least one of a terrestrial, synchronous, and asynchronous communication network.

4. The method of claim 1, wherein the synchronization status of the network is at least one of indicated in the transmission via a status flag and deduced in a terminal from the status flag in the transmission, the transmission comprising a network message.

5. The method of claim 1, wherein the synchronization status of the network is indicated in the transmission via a network capability indication.

6. The method of claim 1, wherein the synchronization status of the network is indicated in the transmission via a network positioning capability indication.

7. The method of claim 1, wherein the synchronization status of the network is indicated in the transmission via at least one of cell and network global navigation satellite systems time relation information.

8. The method of claim 1, wherein the synchronization status of the network is indicated in the transmission via time relation information associated with different radio access technologies.

9. The method of claim 1, wherein the synchronization status of the network is indicated in the transmission implicitly with at least one of a parameter and a measurement request.

10. The method of claim 1, wherein the transmission comprises one of a broadcast transmission and a point-to-point signaling transmission.

11. An apparatus, comprising:

at least one processor; and at least one memory including computer program code;

the at least one memory and the computer program code configured with the at least one processor, to cause the apparatus to perform at least the following:

receive a transmission from a network, wherein the transmission includes global navigation satellite system time-cell time relation information, and wherein the transmission includes a network synchronization status flag;

perform, based on the network synchronization status flag, a determination of a synchronization status of the network from the transmission, wherein the transmission comprises assistance data, and wherein the synchronization status is that cells within the network are synchronized; the network is a synchronous network rather than an asynchronous network;

maintain in a first cell within the network, using said global navigation satellite system time-cell time relation information, accurate time based on the synchronization status of the network; and perform in the first cell within the network, using said accurate time maintained in said first cell, global navigation satellite system satellite signal quick find using predicted or reduced code phases and frequency search space.

12. The apparatus of claim 11, further comprising:

the at least one memory and the computer program code configured with the at least one processor, to cause the apparatus to perform at least the following:

maintain in a second cell within the network, with move of the apparatus from the first cell within the network to the second cell within the network, using said global navigation satellite system time-cell time relation information accurate time based on the synchronization status of the network; and perform in the second cell within the network, using said accurate time maintained in said second cell, global navigation satellite system satellite signal quick find using predicted or reduced code phases and frequency search space.

13. The apparatus of claim 11, wherein the network comprises at least one of a terrestrial, synchronous, and asynchronous communication network.

14. The apparatus of claim 11, wherein the synchronization status of the network is at least one of indicated in the transmission via a status flag and deduced in a terminal from the status flag in the transmission, the transmission comprising a network message.

15. The apparatus of claim 11, wherein the synchronization status of the network is indicated in the transmission via a network capability indication.

16. The apparatus of claim 11, wherein the synchronization status of the network is indicated in the transmission via a network positioning capability indication.

17. The apparatus of claim 11, wherein the synchronization status of the network is indicated in the transmission via at least one of cell and network global navigation satellite systems time relation information.

18. The apparatus of claim 11, wherein the synchronization status of the network is indicated in the transmission via time relation information associated with different radio access technologies.

19. The apparatus of claim 11, wherein the synchronization status of the network is indicated in the transmission implicitly with at least one of a parameter and a measurement request.

20. A computer program product comprising computer executable program code recorded on a computer readable, non-transitory storage medium, the computer executable program code comprising:

code for receiving, at a terminal apparatus, a transmission from a network, wherein the transmission includes global navigation satellite system time-cell time relation information, and wherein the transmission includes a network synchronization status flag;

code for performing, at the terminal apparatus, based on the network synchronization status flag, a determination of a synchronization status of the network from the transmission, wherein the transmission comprises assistance data, and wherein the synchronization status is that cells within the network are synchronized; the network is a synchronous network rather than an asynchronous network;

code for maintaining in a first cell within the network, at the terminal apparatus using said global navigation satellite system time-cell time relation information, accurate time based on the synchronization status of the network; and code for performing in the first cell within the network, at the terminal apparatus using said accurate time maintained in said first cell, global navigation satellite system satellite signal quick find using predicted or reduced code phases and frequency search space.

\* \* \* \* \*